(12) United States Patent
Craft et al.

(10) Patent No.: US 8,689,046 B2
(45) Date of Patent: Apr. 1, 2014

(54) SYSTEM AND METHOD FOR REMOTE RECOVERY WITH CHECKPOINTS AND INTENTION LOGS

(75) Inventors: David J. Craft, Austin, TX (US); Lance Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 12/940,604

(22) Filed: Nov. 5, 2010

(65) Prior Publication Data

US 2012/0117421 A1    May 10, 2012

(51) Int. Cl.
*G06F 11/00* (2006.01)
(52) U.S. Cl.
USPC .............. 714/15; 714/2; 714/4.1; 714/49
(58) Field of Classification Search
USPC ............. 714/2, 13, 15, 4.1, 35; 707/610, 611, 707/639, 649, 656
See application file for complete search history.

(56) References Cited

U.S. PATENT DOCUMENTS

| | | | |
|---|---|---|---|
| 6,954,877 B2 | 10/2005 | Earl et al. | |
| 6,957,221 B1 * | 10/2005 | Hart et al. | 1/1 |
| 7,293,200 B2 | 11/2007 | Neary et al. | |
| 7,890,461 B2 * | 2/2011 | Oeda et al. | 707/614 |
| 2005/0210073 A1 * | 9/2005 | Oeda et al. | 707/200 |
| 2006/0101033 A1 * | 5/2006 | Hu et al. | 707/100 |
| 2008/0091978 A1 * | 4/2008 | Brodsky et al. | 714/38 |
| 2008/0229140 A1 | 9/2008 | Suzuki et al. | |
| 2010/0121824 A1 | 5/2010 | Kawamura et al. | |

FOREIGN PATENT DOCUMENTS

EP    1577775 A1    9/2005

OTHER PUBLICATIONS

Hewlett-Packard;"VERITAS Storage Foundation 4.1 Release Notes"; Google; 2005-2006.
SANS Institute; "Disaster Recovery Plan Strategies and Processes"; Google; 2002.
Symantic; "VERITAS Storage Foundation Oracle HA—Value Proposition and Planning, Installation, Implementation and Operational Considerations"; Google; White Paper, 2008.
Li Kun-et al.; "Design and Implementation of Recovery Subsystem of E-RTDB"; INSPEC/Computer Engineering & Design; Jan. 2008.
Verma-et al.; "SWEEPER: An Efficient Disaster Recovery Point Identification Mechanism"; INSPEC/6th USENIX Conference—IBM India; 2008.
International Search Report and the Written Opinion issued in corresponding PCT Application No. PCT/EP2011/068852.

* cited by examiner

*Primary Examiner* — Sarai Butler
(74) *Attorney, Agent, or Firm* — Terrile, Cannatti, Chambers & Holland, LLP; Robert W. Holland

(57) ABSTRACT

Accurate recovery of a primary server at a recovery server is accomplished with reduced network overhead by maintaining at the recovery server checkpoints taken over time of the primary server and an intention log of logical transactions pending and complete by the primary server. The recovery server is brought to the operational state of the primary server as of failure at the primary server by recovering the most recent checkpoint and then executing the transactions indicated by the intention log as received but not complete as of the time that the checkpoint was taken.

20 Claims, 2 Drawing Sheets

SYSTEM AND METHOD FOR REMOTE RECOVERY WITH CHECKPOINTS AND INTENTION LOGS

BACKGROUND OF THE INVENTION

1. Field of the Invention

The present invention relates in general to the field of computer system backup, and more particularly to a system and method for remote recovery with checkpoints and intention logs.

2. Description of the Related Art

Business enterprises often maintain disaster recovery computing resources that can take over when primary computing resources fail, such as an application that runs on a server to support multiple clients in performing critical tasks. Although disaster recovery resources can be co-located with primary resources, businesses often use remote disaster recovery resources to improve disaster recovery reliability. For instance, co-located primary and disaster recovery resources will both fail if power to their common location is interrupted while simultaneous power failures at primary and remote locations are unlikely.

Remote disaster recovery of a server application workload often involves a hot or cold start of the application workload at a server of the remote location and a pairing with an inexact mirror of the application workload data available at the remote location. Typically, the copy of application workload data available at the remote location is an "inexact mirror" because even synchronous mirroring of the application workload data to the remote location will sometimes result in incomplete copies of the application workload data at the remote location if a failure occurs before completion of processing of a mirror update of currently changing data. Thus, a hot or cold start of a workload at a remote location means that the application at the remote location must include code that understands and can recover from an inexact mirror, such as by starting the application from a known data recovery rendezvous point. The rendezvous point allows the application at the remote recovery location to bring the application workload data to a consistent state and to proceed forward with new processing after the recovery. A disadvantage of this approach is that the remote recovery software is typically complex and application specific.

An alternative to remote recovery with an inexact mirror is the use of hypervisor checkpointed workload instances as a form of hot start of an application. By pairing a workload checkpoint with a checkpoint of the workload data storage at the same instant, the need for a data recovery rendezvous point is removed. This type of checkpointing is used to save a workload and its data for a subsequent restart, such as for end of year compliance, but is not practical for use in a remote disaster recovery situation because communicating a checkpoint of a workload and its data through a network to a remote location is resource and time prohibitive. An example that illustrates this difficulty in a transaction sensitive environment is a set of ATM clients of a bank that request transactions to a database server. In the example, a database server that handles ATM transactions is checkpointed along with its data at time T1. The checkpoint is mirrored to a remote disaster recovery site with the mirror accomplished at time T2. For purposes of the example, checkpoints continue at odd intervals and mirroring continues at even intervals, although these operations could be interleaved at different intervals in other example embodiments. If an ATM client receives confirmation of an intermediate transaction to the database between a checkpoint and a mirror, i.e., between T1 and T2, and a failure occurs after the checkpoint but before the mirroring, the disaster recovery site will not have the confirmed transaction as a part of its hot start because the mirror is incomplete. Thus, as the result of the failure at a primary server, a bank customer who made a deposit at the ATM will not get credit for the deposit. Most solutions that attempt to avoid such lost transactions are complex and very application specific.

SUMMARY OF THE INVENTION

Therefore, a need has arisen for a system and method which provides a generally applicable solution for disaster recovery that will not miss intermediate transactions.

In accordance with the present invention, a system and method are provided which substantially reduce the disadvantages and problems associated with previous methods and systems for disaster recovery of a failed computer system. An intention log tracks transactions started and completed at a primary computer system relative to checkpoints taken of the primary computer system. The primary computer system is recovered at a recovery computer system by restoring the checkpoint and then executing transactions not completed by the primary computer system at the time of the checkpoint used for the recovery.

More specifically, a primary server receives ATM transactions and executes the transactions for ATM clients. A checkpoint of the primary server is taken at periodic intervals and then mirrored to a recovery server. A checkpoint taken time is logged to an intention log for the start of each checkpoint and a checkpoint mirroring complete time is logged to the intention log for the completion of the mirroring operation at the recovery server. For each transaction, a transaction start time is logged to the intention log and a transaction complete time is logged to the intention log. Mirroring of intention log entries and checkpoints may be done asynchronously as background operations to minimize the impact of network resources. Transaction complete times are sent synchronously so that transactions reported to clients as complete are reflected as complete in the primary and recovery intention logs before the clients receive the results of the transaction. Upon detection of a failure of the primary server, recovery is made at the network location of the recovery server by initiating the most recently completed checkpoint as reflected by the intention log and then executing all transactions in the intention log that are not complete at the time the checkpoint was taken.

The present invention provides a number of important technical advantages. One example of an important technical advantage is that logical operations that must be synchronously reflected at both a primary and a recovery network location are small relative in size to checkpointed workload and data. The reduced size reduces overhead at both the primary and recovery network locations as well as network traffic. In addition, the continuum of checkpoints of the workload and data at the primary and recovery network locations may occur with less frequency, such as many minutes between each checkpoint, and the mirroring of the checkpoints can be asynchronous. The solution at a system level provides an adaptable disaster recovery solution to any application with minimal programming support while still allowing individual optimization in specific areas of interest, such as by using a solid state drive for the intention log to enhance reliability.

BRIEF DESCRIPTION OF THE DRAWINGS

The present invention may be better understood, and its numerous objects, features and advantages made apparent to FIG. 1 depicts a block diagram of a system for remote disaster recovery of a primary server at recovery server using a checkpoint and an intention log.

DETAILED DESCRIPTION

Figure 1:
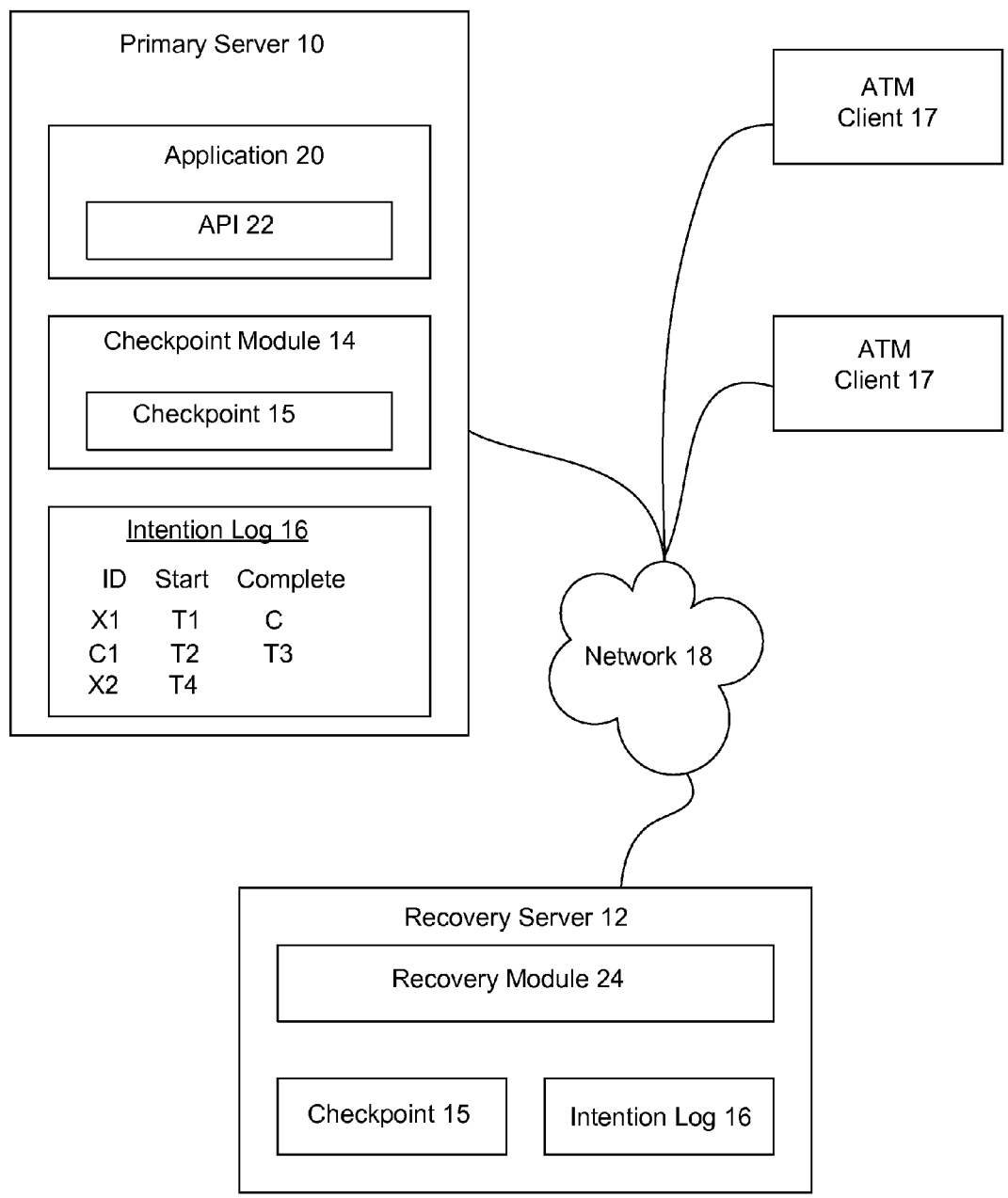

An application level programmable intention log with an interlocked workload and data checkpoint system provides disaster recovery of computer system with reduced network traffic overhead. The intention log is an operating system provided service that records logical inputs at a primary computer system and is mirrored synchronously to two or more recovery network locations for high reliability in the event of multiple failures. An application programming interface of an application executing on the primary computer system logs logical operations at the intention log, such as transaction requests by an automated teller machine to deposit or withdraw money, and reflects the intention log entries to a remote recovery computer system. When the intent log is paired with temporal knowledge of workload and data checkpoints, then recovery from a failure is possible at the recovery network location by reinitiating logical operations not completed as of the most recent checkpoint recovery state. Replay of the incomplete logical operations at the disaster recovery system brings the recovery computer system to the same state as the failed primary computer without missing transactions and without complicated programming at the application level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts a system for remote disaster recovery of a primary server 10 at recovery server 12 using a checkpoint 15 and an intention log 16. Recovery server 12 recovers the operating state of primary server 10 in the event of a failure of primary server 10 by maintaining an independent but coordinated intention log that allows a replay of transactions of primary server 10 that were not complete at the time of a most recent checkpoint created for primary server. Primary server 10 handles transaction requests sent from clients 17 through a network 18, such as automated teller machine (ATM) requests to deposit and withdraw funds. Primary server 10 decodes the transaction requests and then executes logical operations to complete the transaction request, such as posting a deposit or withdraw to client's account and then authorizing the requesting ATM client 17 to accept or dispense funds. For example, primary server receives a transaction request X1 from a client 17 to be handled by an application 20 running on primary server 10. An application programming interface (API) 22 of application 20 writes a start transaction for X1 to intention log 16. The start transaction X1 is also written to intention log 16 of recovery server 12, such as by synchronously or asynchronously mirror the start transaction request to recovery server 12 through network 18. For improved data security, intention logs 16 can be maintained in non-volatile memory, such as a solid state drive at primary server 10 and recovery server 12. Once primary server 10's application 20 completes transaction X1, API 22 writes a transaction complete entry for transaction X1 at intention log 16 of primary server 10 and mirrors the transaction complete entry to intention log 16 of recovery server 12. Application 20 does not respond to client 17 until the transaction complete is written to both primary server 10 and recovery server 12 intention logs 16, such as with a synchronous write to each intention log 16 by API 22.

Concurrent with application 20 recording transactions to intention logs 16, checkpoint module 14 takes checkpoints 15 of primary server 10, such as hypervisor workload and data checkpoints that will allow a recovery of the operating state of primary server 10 as of the time of the checkpoint 15. Checkpoints 15 may be taken at predetermined intervals, at periodic intervals or based on other factors, such as the number of transactions handled by primary server 10. In the example embodiment, a simultaneous checkpoint of workload and data of primary server 10 is taken at time T2, and a checkpoint taken entry C1 is made at intention log 16 of primary server 10 and mirrored to intention log 16 of recovery server 12. After entry of the checkpoint taken to intention logs 16, checkpoint module 14 starts an asynchronous mirror of checkpoint C1 to recovery server 12. By performing the checkpoint mirror as a background operation, checkpoint module 14 avoids bottlenecks from overuse of network 18. When mirror of checkpoint C1 is complete, a checkpoint complete entry is made to intention logs 16 with the time of the completion of mirroring T3. Storing the checkpoint at recovery server 12 allows recovery of the operating state of primary server 10 at recovery server 12 as of the time T2 at which the checkpoint was taken.

In order to accurately recover primary server 10 to recovery server 12 as of a failure of primary system 10, recovery server 12 initiates the checkpoint and then replays transactions that would have been performed by primary server 10 after the time T2 at which the most recent completely-mirrored checkpoint was taken. Upon notification of a failure of primary server 10, a recovery module 24 executing on recovery server 12 restores the operating state from checkpoint 15 as of time T2 and then executes transactions listed in the intention log 16 as not complete as of time T2. Transactions that are not complete as of the time a checkpoint is taken may be identified by a comparison of complete times tracked in intention log 16 or by the order in which transactions and checkpoints are interleaved in intention log 16.

In the example embodiment, at time T4 primary server receives a transaction request from a client 17 and so API 22 writes a start transaction X2 to intention log 16 of primary server 10, which is asynchronously mirrored to intention log 16 of recovery server 12. Application 20 executes the transaction and API 22 synchronously writes a transaction complete to intention log 16 of primary server 10 and recovery server 12. At this point, application 20 has performed the transaction and responded to client 17, the intention log 16 of primary server 10 and recovery server 12 each reflect completion of the transaction, however, the checkpoint 15 stored at recovery server 12 does not reflect any result of transaction X2 because the most recent completed checkpoint was taken at time T2. If at time T4 primary server 10 fails, recovery module 24 initiates recovery of the operating state of primary server 10 at time T4 to run on recovery server 12. Recovery module 24 references intention log 16 to identify checkpoint C1 as the checkpoint having the most recent complete time T3 and applies checkpoint C1 to execute application 20 on recovery server 12 with the checkpoint 15 workload and data associated with time T2, the time when the checkpoint was taken. Recovery module 24 then references intention log 16 to identify transactions that were not complete as of time T2, the time at which checkpoint C1 was taken. In the example embodiment, transaction X2 is identified as not complete as of time T2. Accordingly, recovery module 24 has application 20 execute transaction X2 with the workload and data restored by reference to checkpoint 15 C1 to bring recovery server 12 to the operating state at which primary server 10 failed. Recovery server 12 is then in a condition to take over for primary server 10. Note that recovery server 12 may execute transactions received by primary server 10 and identified in intention log 16 whether or not completed at the time of failure of primary server 10. Because a transaction received at primary server 10 is not executed until the transaction start is mirrored to intention log 16 of recovery server 12, all transactions will be accomplished that are acknowledged to a client 17 and unacknowledged client requests can be repeated to recovery server 12.

Figure 2:
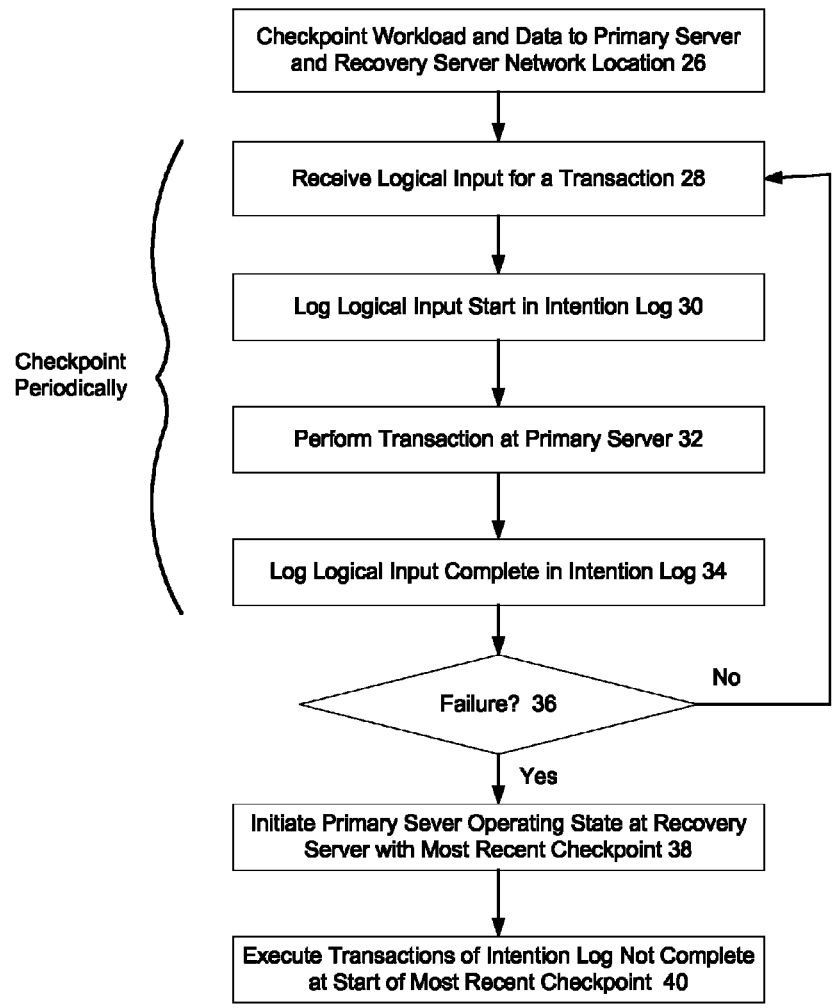
FIG. 2 depicts a flow diagram of a process for remote recovery of a primary server with checkpoints and an intention log.

Referring now to FIG. 2, a flow diagram depicts a process for remote recovery of a primary server with checkpoints and an intention log. The process begins at step 26 with a checkpoint of workload and data at a primary computing device. A time is logged in an intention log for when the checkpoint is taken and a completion time is logged in the intention log for when mirroring of the checkpoint to a recovery computing device is complete. Mirroring of the checkpoint, the checkpoint taken time and the checkpoint complete time may be performed asynchronously as a background operation to minimize the impact on system performance. At step 28, a transaction logical input is received at the primary computing device for execution, such as an ATM deposit or withdrawal request. The transaction start time is logged at step 30 in an intention log of the primary computing device and the recovery computing device and, at step 32, the transaction is executed. At step 34, the transaction is completed and the completion time is logged in the intention log of the primary computing device and the recovery computing device. The primary computing device does not report the transaction as complete to a requesting client device until the transaction is logged as complete at the recovery computing device so that all completed transactions are tracked at the intention log of the recovery computing device. At step 36 a determination is made of whether a predetermined failure condition is met, such as a failure of the computing device, and if not the process continues to receive and perform transactions. As transactions are performed, checkpoints of the primary computing device are taken based upon predetermined conditions, such as a time interval since the last checkpoint. If a checkpoint is due, the process continues to step 26 to initiate the checkpoint. If the checkpoint is not due, the process continues to handle transactions. Note that the interval for the checkpoint may occur when some transactions are still executing and thus not complete.

A failure of the primary computing device may be detected at any point in the process from step 26 to step 36. Once a failure of the primary computing device is detected, the process continues at step 38 with initiation of the most recently completed checkpoint logged in the intention log to bring the recovery computing device to the workload and data operating state of the primary computing device at the time the checkpoint was taken. At step 40, the recovery computing device retrieves transactions from the intention log that were not complete at the time the most recent checkpoint was taken and executes those transactions to bring the recovery computing device to the operating state of the primary computing device at failure. The recovery computing device may execute transactions that were completed by the computing device and thus reported to the client; no further action need be taken for such transactions. The recovery computing device may execute transactions that were not complete at the time of failure of the primary computing device; the results of such transactions are reported to the clients. The recovery computing device then takes over for subsequent transactions sent from clients.

Although the present invention has been described in detail, it should be understood that various changes, substitutions and alterations can be made hereto without departing from the spirit and scope of the invention as defined by the appended claims.

What is claimed is:

1. A method for recovery of a server, the method comprising:
   sending transaction requests from clients to the server through a network;
   receiving the transaction requests at the server;
   logging a start transaction in an intention log at the start of each transaction request;
   logging a complete transaction in the intention log at completion of each transaction request;
   taking a checkpoint at predetermined times, the checkpoint defining a recovery state for the server;
   asynchronously mirroring the checkpoint to a recovery server;
   logging a checkpoint taken in the intention log at the start of each taking a checkpoint;
   logging a checkpoint mirroring complete at completion of the mirroring to the recovery server; and
   maintaining the intention log at the recovery server by asynchronously mirroring start transactions from the server to the recovery server and synchronously mirroring complete transactions from the server to the recovery server.

2. The method of claim 1 further comprising:
   detecting a failure at the server at an operating state; and
   recovering the operating state at the recovery server by reference to the checkpoint and the intention log.

3. The method of claim 2 wherein recovering the operating state at the recovery server further comprises:
   referencing the intention log to identify a most recent checkpoint having a mirroring complete;
   applying the most recent checkpoint to bring the recovery server to an operating state associated with the checkpoint; and
   executing at the recovery server all transaction requests having a complete transaction logged in the intention log after the time logged as the start of the taking of the most recent checkpoint.

4. The method of claim 3 further comprising:
   executing at the recovery server all transaction requests having a start transaction logged in the intention log that lacks an associated complete transaction logged in the intention log.

5. The method of claim 4 wherein the transaction requests comprise automated teller machine requests.

6. The method of claim 1 wherein the intention log comprises an operating system service.

7. The method of claim 1 wherein the checkpoint comprises a hypervisor checkpointed workload instance.

8. The method of claim 7 wherein the checkpoint further comprises a checkpointed data storage instance associated with the workload instance.

9. A system for recovery of a primary server operating state at a recovery server, the system comprising:
   an application executing on the primary server, the application performing transaction requests received from clients through a network;
   an intention log associated with the primary server and interfaced with the application to record a transaction request start time and complete time for each of the transaction requests;
   a checkpoint module associated with the primary server, the checkpoint module operable to take a checkpoint of the primary server at predetermined times, the checkpoint defining a recovery state for the primary server, to asynchronously mirror the checkpoint to the recovery server and to log at the intention log a start time for each mirror and a completion time for each mirror;
   an intention log associated with the recovery server and interfaced with the application to asynchronously record a start time for each of the transaction requests and to synchronously record a complete time for each of the transaction requests; and
   a recovery module associated with the recovery server, the recovery module operable to apply the checkpoint and the intention log to bring the recovery server to the operating state.

10. The system of claim 9 wherein the recovery module applies the checkpoint and the intention log to bring the recovery server to the operating state by applying the most recent checkpoint of the intention log that has a completion time to bring the recovery server to an operating state associated with the checkpoint and then executing at the recovery server the transactions of the intention log that lack a completion time as of the start time of the applied checkpoint.

11. The system of claim 10 wherein the checkpoint comprises a hypervisor checkpointed workload instance.

12. The system of claim 10 wherein the checkpoint further comprises a hypervisor checkpointed storage data instance for storage associated with the workload.

13. The system of claim 10 further comprising an application programming interface of the application operable to write to the intention log a start and a complete time for each transaction request.

14. The system of claim 13 wherein the application programming interface synchronously writes to a first intention log associated with the primary server and a second intention log associated with the recovery server.

15. The system of claim 14 wherein the transaction requests comprise requests by an automated teller machine.

16. A method for recovery of a primary server at a recovery server, the method comprising:
    taking plural checkpoints of the primary server over time;
    communicating the checkpoints to the recovery server;
    performing transactions at the primary server;
    maintaining a log at the recovery server having a start time for each checkpoint, a complete time for each checkpoint, a start time for each transaction and a complete time for each transaction, the start time for each transaction communicated asynchronously from the primary server and the complete time for each transaction communicated synchronously from the primary server; and
    recovering the primary server at the recovery server by restoring the checkpoint having the most recent complete time and executing each transaction having a complete time of after the start time of the checkpoint used for restoring the primary server at the recovery server.

17. The method of claim 16 wherein recovering the primary server further comprises executing each transaction lacking a complete time.

18. The method of claim 17 further comprising preventing execution of a transaction until a start time for the transaction is written to the log.

19. The method of claim 18 wherein the transactions comprise automated teller machine requests sent by automated teller machine clients to the primary server.

20. An application level programmable intention log with an interlocked workload and data checkpoint comprising:
    a non-transitory machine-readable storage medium;
    instructions stored on the machine-readable storage medium to:
    take plural checkpoints of a primary server over time;
    asynchronously communicate the checkpoints to a recovery server;
    maintain a log at the recovery server having a start time for each checkpoint, a complete time for each checkpoint;
    maintain an intention log of requested transactions at the recovery server, the intention log asynchronously tracking transaction start times and synchronously tracking transaction complete times; and
    recover the primary server at the recovery server by restoring the checkpoint having the most recent complete time.

* * * * *